UNITED STATES PATENT OFFICE.

PHILIP E. LOCKWOOD, OF LONDON, ENGLAND.

IMPROVEMENT IN EXTRACTS OF BEER OR OTHER FERMENTED BEVERAGES.

Specification forming part of Letters Patent No. 169,818, dated November 9, 1875; application filed July 12, 1875.

*To all whom it may concern:*

Be it known that I, PHILIP EMBURY LOCKWOOD, a citizen of the United States, at present of 96 Leadenhall street, in the city of London, England, have invented an Improved Process of Treating Beer, Ale, Porter, and other Fermented Beverages, of which the following is a specification:

It is well known that all beers contain but a small proportion of solid constituents, commonly averaging from six to fifteen per cent. The amount of alcohol (anhydrous) also rarely exceeds ten to twelve per cent. of the entire bulk of beer, and more usually may be estimated at from three to six per cent. in volume. It is therefore evident that if the extractive matters and alcohol can be retained, and a greater or less quantity of the water driven off, the chief constituents of beer will be comprised within a greatly-contracted compass.

In order to effect this object I take beer of any description, or any other fermented beverage of a like nature, at any stage of fermentation, but preferably when it is ripe and in good condition for drinking, and I evaporate such beer or other beverage in a vacuum-pan of any suitable description, preferably at a low temperature—say from 120° to 160° Fahrenheit—until a large part of its constituent water and alcohol is distilled away, and it is reduced to a thick fluid or semi-fluid. The beer or other like beverage may be reduced to a solid form by any known means; but, seeing objections to bringing it to a dry state, I do not recommend it, except when for use in extreme temperatures. During the process of condensation the water and alcohol which are removed pass off in the vapor, which is condensed in a receiver attached to the vacuum-pan, and I then redistill the liquid condensed in the receiver until the alcohol is concentrated to a considerable strength; or a rectifying-still of any convenient construction may be attached to the vacuum-pan or used separately, for the purpose of extracting and retaining the desired proportion of alcohol.

The said beer or other similar beverage, when in a thick fluid or semi-fluid form, is drawn from the vacuum-pan into convenient tubs or other vessels, and any scum which may have formed upon it is carefully removed. It is then poured into tins or other suitable vessels, which are hermetically sealed for exportation and preservation, or into convenient jars, kegs, or other vessels, for home use or for export, and the proper proportion of alcohol may be mixed with it, either before it is inclosed in the tins or vessels or at any convenient time afterward, care being taken to cool the fluid taken from the vacuum-pan before adding the alcohol.

The proper proportion of alcohol to be added may be determined either by analyzing samples of the beer or similar beverage before condensing it, or any desired amount of alcohol may be added, be it more or less, proportionately, than was present in the beverage before it was condensed. If it is desired to have a non-intoxicating beverage, no alcohol need be added.

The beer or other similar beverage which was taken is, by the process herein described, greatly reduced in bulk, the fermentation and tendency to ferment is destroyed by the heating or greatly reduced, and the concentrated fluid will keep good for a long period of time; but I find it will preserve its properties better when hermetically sealed. It may at any time be reconverted into beer, or as near as may be into its original state, by mixing any desired proportion of water or aerated water with a due proportion of the concentrated extract, (containing any desired amount of alcohol;) or effervescence may be imparted to it by any aerating-machine which will charge the beverage with air or carbonic-acid gas, either mechanically or by means of effervescing mixtures; and the beer or other similar beverage may be bottled or retained in any desired vessel, to be drawn as wanted; or fermentation may be set up, if desired, by adding yeast or any other substance which will excite fermentation, by which means effervescence will be quickly imparted.

If light alcoholic strength is desired, alcohol may be developed by simply setting up fermentation without adding alcohol.

Previous to bottling or racking, the sediment, if any, should be removed by decantation, filtering, pressing, or otherwise.

If it is found that during the process of condensation any of the strength or aroma of the hops may have passed off in the vapor, hops may again be added, either by "dry-hopping" the water which is added, or the beer after it is remade, or by adding at any time the desired proportion of extract or essence of hops; or beer may be taken which has originally been brewed with less hops than usual, and the due or desired proportion of hops may be added when remade.

It is sometimes desirable to add a small quantity of sugar when it is remade and fermented, in order to furnish an increased amount of fermentative matter.

It is well known that perhaps the most difficult part of brewing is the fermentation of the worts. This requires great skill and judgment to conduct and control. The temperature must be carefully regulated; and it is difficult to control the fermentation of the worts in very hot weather, even in temperate climates. While for this reason breweries are rarely successfully established in tropical countries, the same difficulties attend the fermentation of condensed worts when remade, as it is necessary to develop the proper flavor by careful fermentation, while I purposely let the brewer conduct the fermentation, preferably, to a point where the beer is of good drinkable flavor, so that when remade it is only necessary to resume the fermentation sufficiently to develop briskness, or to impart life and effervescence to it mechanically, as by aeration. In either case it is fit to drink almost immediately, and with little trouble or risk.

The principal object being to drive off a large part of the constituent water, and to retain as much as possible of the solid matters and alcohol, any means which will accomplish this end may be used. For example, I can first distill off the alcohol by the use of any still of convenient construction, and, when the alcohol has been distilled off, can continue the process of removing the water by condensation, either in a vacuum-pan or an open pan, until the beverage is reduced to the required consistency; or, if the beer or other similar fermented beverage which is taken is of light alcoholic strength, so that it may not be profitable to separate the alcohol by a process of distillation, or if for any reason it is not desired to save the alcohol, the beer or other similar beverage may be condensed in a vacuum-pan, or even in an open pan, and when remade and fermented a certain proportion of alcohol will be developed; or, if remade without adding alcohol, and aerated or charged with carbonic-acid gas to impart briskness, a non-intoxicating beverage will be produced.

When cider, perry, or wine is taken, the alcohol and extractive matters can be preserved and mixed, and, when remade, only require diluting with the proper or desired proportion of water; or, if effervescence is required, it can be imparted by aeration, refermentation, or otherwise; or a less amount of alcohol may be put back, if desired, and a lighter beverage be reproduced; or, if a non-intoxicating beverage be desired, no alcohol need be restored to it.

The following advantages, among others, may be enumerated as regards beer: First, its condensed form, (it being reduced to one-sixth to one-twelfth of its original bulk, more or less,) and the consequent saving of space, and size and cost of packages, and carriage, thus enabling beer to be exported at much less cost than in the ordinary way. Second, the amount of alcohol in beers may be greatly reduced, if desired. It is now considered necessary to make beer for export of great alcoholic strength, in order to preserve it in hot climates; but under this process the beer will keep good with less alcohol, so that a less amount of alcohol than was distilled off may be remixed with it, or a less alcoholic beer may be taken for export. Third, the ease, cheapness, and safety with which it may be exported and stored, and remade at convenience, it being fit to drink almost immediately.

I am aware that concentrated extract of malt, and concentrated extract of hops, and concentrated extract of malt and hops (unfermented beer or worts) have heretofore been made. I therefore do not claim such extracts; but

I claim as my invention—

As a new article of manufacture, the within-described condensed extract of fermented beverage.

In witness whereof I have signed my name to this specification in the presence of two subscribing witnesses.

P. E. LOCKWOOD.

Witnesses:
 CHAS. MILLS,
  47 *Lincoln's Inn Fields, London.*
 FREDK. C. DYER,
  47 *Lincoln's Inn Fields, London.*